Sept. 1, 1936.  E. E. JONES  2,052,772

SHIELD ATTACHMENT FOR EYEGLASS FRAMES

Filed July 23, 1934

Inventor.
Earl Elmer Jones
By
R. S. Berry
Att'y.

Patented Sept. 1, 1936

2,052,772

UNITED STATES PATENT OFFICE 2,052,772

SHIELD ATTACHMENT FOR EYEGLASS FRAMES

Earl Elmer Jones, Glendora, Calif.

Application July 23, 1934, Serial No. 736,568

2 Claims. (Cl. 2—13)

This invention relates to an attachment for eye-glass frames and has as its primary object the provision of a curved wall protruding inwardly from the upper margin of the eye-glass frame so formed as to extend beneath the eyebrows and thereby act to shield the eyes from over-head light, from dust and dirt, and from liquid such as rain or perspiration, and at the same time provide a support for sagging eyebrows and drooping eyelids.

Another object is to provide a construction in such inwardly projecting walls that when the latter are serving to protect the eyes from liquid, such as water or perspiration, flowing from the forehead, such liquid will be drained and discharged from the ends of the wall and in most part from the outer end thereof.

With the foregoing objects in view together with such other objects and advantages as may subsequently appear, the invention resides in the parts and in the combination, construction and arrangement of parts hereinafter described and claimed and illustrated by way of example in the accompanying drawing in which:

Figure 1:
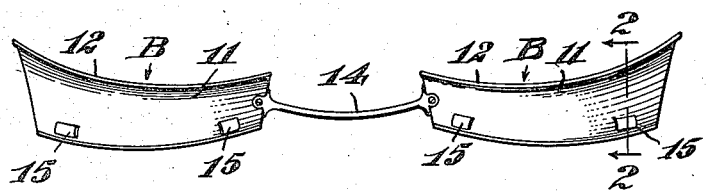
Fig. 1 is a plan view of the device showing a preferred embodiment thereof.

Referring to the drawing more specifically A indicates generally a pair of eye glasses which as here shown embodies the usual eye glass frame 7 fitted with lenses 8 and having a nose engaging bridge 9 and ear engaging arms 10.

In carrying out the present invention the eye glasses A are fitted with a pair of rearwardly extending walls B which extend inwardly from the upper margin of the eye glass frame 7 on opposite sides of the bridge 9 and are adapted to project beneath the eye-brows of the wearer. Each of the walls B are curved longitudinally to conform to the upper margin of the eye glass frame and is formed at its extended marginal portion with a transverse concave curvature to form a longitudinally extending trough 11 as particularly shown in Fig. 2; each shield being formed at its extended margin with an upturned lip or rim 12 and being formed on its opposite marginal portion with a reverse curve relative to the concave outer marginal portion so as to arch upwardly at its intersection with the eye glass frame.

The walls B are thus contoured so as to serve several purposes, namely to shield the eyes from excessive light, to protect the eyes from dust and dirt, and also to prevent liquid such as perspiration or rain from flowing into the eyes from the forehead; in this latter instance the trough 11 serving to direct liquid disposed on the shield to the outer ends of the latter.

The walls B are also contoured or shaped to afford a support for the eye-brows and are thus serviceable to persons afflicted with sagging eyebrows since the walls together with the support afforded by the eye-glass frames serve to assist tired or weakened muscles in elevating the eyebrows.

Furthermore the rim 12 may be designed to fit into the exterior fold of the eyelid and comfortably support it in a natural open position thus rendering the device applicable for use by persons suffering from ptosis or the permanent drooping of the falling of the upper eyelid due to paralysis of the lifting muscle.

Figure 2:
Fig. 2 is a detail in cross section taken on the line 2—2 of Fig. 1.
Figure 3:
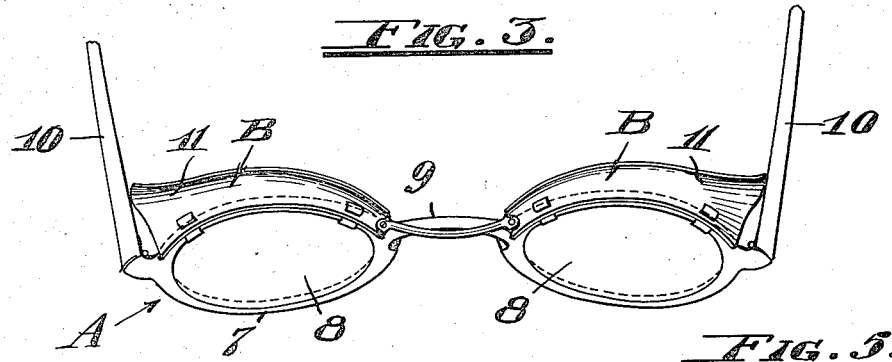
Fig. 3 is a perspective view showing the device applied to an eye-glass frame.

The shields may be applied to the eye glass frame in any suitable manner being shown in Figs. 1 and 2 as connected together by a bridge 14 and as equipped with spring clamps 15 adapted to be positioned astride the eye glass frame in frictional clamping engagement therewith as shown in Fig. 3.

Figure 5:
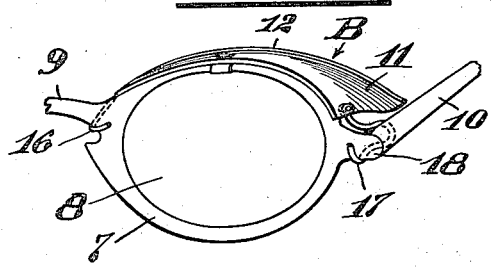
Fig. 5 is a view in elevation illustrating a modified form of the invention.
Figure 4:
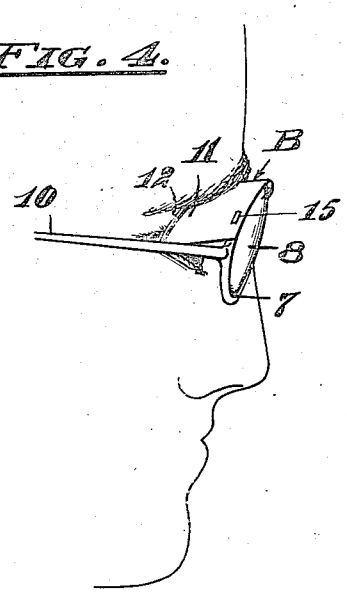
Fig. 4 is a perspective view illustrating the application of the invention.
Figure 6:
Fig. 6 is a perspective view of the device shown in Fig. 5 illustrating it as detached.

In the construction shown in Figs. 5 and 6 the shield B is provided with hooks 16 and 17 at the opposite ends thereof with the hook 16 at its inner end adapted to engage the eye glass frame at the inner end of the bridge 9 while the hook 17 at the outer end thereof is adapted to extend under and engage lugs 18 at the outer end of the eye glass frame. A spring clip 19 is provided intermediate the ends of the shield for effecting clamping engagement with the upper margin of the frame.

I claim:

1. In an eye glass frame, a wall protruding rearwardly from the upper margin of said frame and extending downwardly to project beneath the eye-brow and adapted to support the latter, said wall having an upturned lip on its protruded margin forming a trough to underlie the eye-brow for directing liquid deposited on the wall to the outer end of the latter.

2. In an eye-glass, a shield, means for mounting said shield to extend rearwardly relative to said eye-glass; said shield having a downwardly and then upwardly extending transverse curvature terminating in an upstanding lip on its outer margin, said lip being arranged to be disposed beneath the eye-brow in close proximity to the upper eye-lid.

EARL ELMER. JONES.